(No Model.)

F. ZAHN.
PITCHER OR POT.

No. 567,801. Patented Sept. 15, 1896.

Witnesses:
John Becker.
W. F. Whiting

Inventor:
Franz Zahn
by his attorneys
Roeder & Briesen

THE NORRIS PETERS CO., PHOTO-LITHO., WASHINGTON, D. C.

UNITED STATES PATENT OFFICE.

FRANZ ZAHN, OF NEW YORK, N. Y.

PITCHER OR POT.

SPECIFICATION forming part of Letters Patent No. 567,801, dated September 15, 1896.

Application filed February 29, 1896. Serial No. 581,245. (No model.)

*To all whom it may concern:*

Be it known that I, FRANZ ZAHN, of New York city, New York, have invented an Improved Pitcher or Pot, of which the following is a specification.

This invention relates to a pitcher or pot which is so constructed that access to the interior of the spout may be readily had for the purpose of removing accumulated sediment. To this effect the strainer, which protects the inner opening of the spout, is made in the form of a pivoted removable gate, which may be readily grasped by the hand and withdrawn if the spout is to be cleaned.

Figure 1:
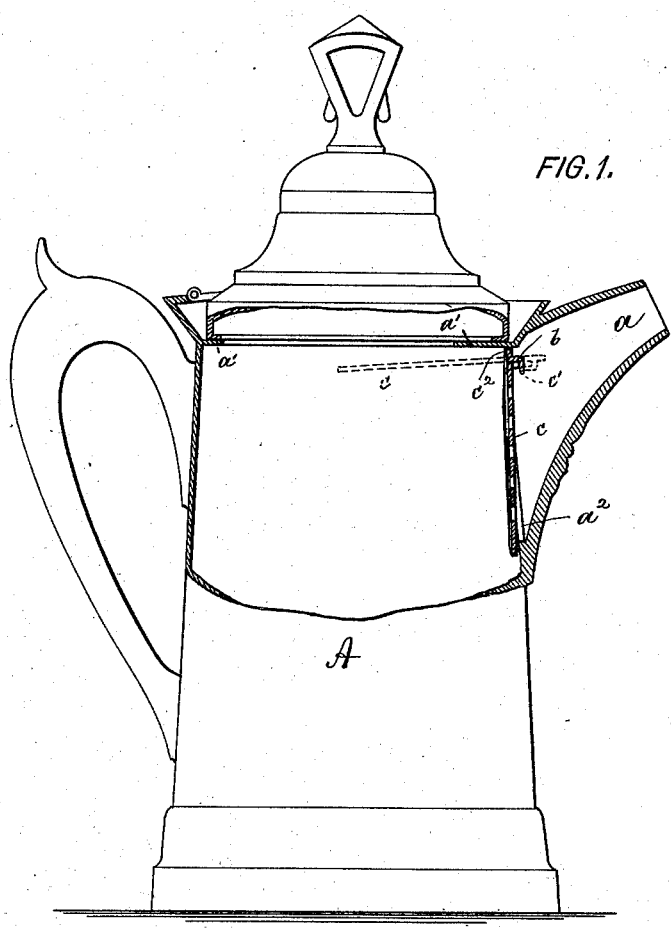
Figure 3:
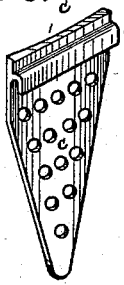
Figure 2:
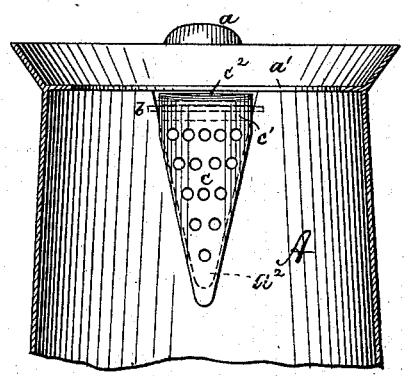

In the accompanying drawings, Figure 1 is an elevation, partly in section, of an ice-pitcher embodying my invention. Fig. 2 is an interior view of part of the same, looking toward the strainer; and Fig. 3, a perspective view of the strainer.

The letter A represents a pot or pitcher of suitable design and conformation, and provided with the discharge spout or nozzle $a$. A short distance below the top flange $a'$ of the vessel A there is stretched across the inner opening $a^2$ of the spout a wire $b$, the ends of which are soldered or otherwise connected to the wall of the vessel. Upon this wire is hung a foraminated gate or strainer $c$, which is made of a size and form to cover the opening $a^2$. The strainer $c$ is provided with a hook $c'$, adapted to engage the wire $b$, and with an upwardly-projecting flange $c^2$ above the hook. This flange normally engages the top flange $a'$ of vessel A, Fig. 1, and prevents the strainer from becoming dislodged when the vessel is tilted. If the spout is to be cleaned, the strainer is swung up into a horizontal position (dotted lines, Fig. 1) and may then be readily unhooked and removed, when free access to the interior of the spout may be had. To replace the strainer, the manipulation is reversed.

It will be seen that with my invention the interior of the spout is readily accessible for the purpose of giving it a thorough cleaning. The strainer is so hung that it may be reached by the fingers without passing the whole hand into the vessel A, and that it may be removed and replaced in a very simple manner.

What I claim is—

The combination of a vessel having a spout with a wire extending across the inner spout-opening, and with a strainer having a hook adapted to engage the wire and an upwardly-extending flange adapted to engage the top flange of the vessel, substantially as specified.

FRANZ ZAHN.

Witnesses:
F. V. BRIESEN,
W. G. WHITING.